United States Patent [19]

Muscatell

[11] 4,432,516
[45] Feb. 21, 1984

[54] VARIABLE AIRFOIL ASSEMBLY

[76] Inventor: Ralph P. Muscatell, 2007 NE. 20th Ave., Fort Lauderdale, Fla. 33305

[21] Appl. No.: 316,561

[22] Filed: Oct. 30, 1981

Related U.S. Application Data

[63] Continuation-in-part of Ser. No. 136,682, Apr. 2, 1980, abandoned.

[51] Int. Cl.³ .......................... B64C 3/48; B64C 9/32
[52] U.S. Cl. ................................... 244/219; 244/113; 244/201
[58] Field of Search ................... 244/110 D, 113, 198, 244/201, 210, 213, 214, 218, 219

[56] References Cited

U.S. PATENT DOCUMENTS

| | | | |
|---|---|---|---|
| 1,549,122 | 8/1925 | Lanier | 244/213 |
| 1,745,677 | 2/1930 | Hopper | 244/219 |
| 1,749,021 | 3/1930 | Davis | 244/210 |
| 1,818,309 | 8/1931 | DeVillard | 244/210 |
| 1,848,368 | 3/1932 | McMaster . | |
| 1,881,159 | 10/1932 | Apolloniou et al. | 244/113 |
| 2,288,750 | 7/1942 | Seeman | 244/44 |
| 2,364,006 | 11/1944 | Smith | 244/44 |
| 3,716,209 | 2/1973 | Pierce | 244/123 |
| 4,182,503 | 1/1980 | Muscatell | 244/219 |

Primary Examiner—Trygve M. Blix
Assistant Examiner—Rodney Corl
Attorney, Agent, or Firm—Oltman and Flynn

[57] ABSTRACT

The present variable airfoil assembly has a fixed airfoil member with a shallow recess in the top in which an adjustable airfoil member is seated snugly, when lowered, to present a convex top surface which merges smoothly with the top surface on the fixed airfoil member in front and behind. When the adjustable airfoil member is raised, the fixed airfoil member presents a top surface below it which is continuous for most of its extent to minimize air turbulence. Reinforcing ribs on the adjustable airfoil member extend down through longitudinal gaps in the top of the fixed airfoil member and are coupled to cylinder-and-piston units for raising and lowering the adjustable airfoil member. A transverse gap extending across the top of the nose of the fixed airfoil member passes adjustable filler pieces which can extend up between the nose and the front edge of the adjustable airfoil member when the latter is raised or be retracted down to permit air to flow under the adjustable airfoil member for braking purposes.

19 Claims, 13 Drawing Figures

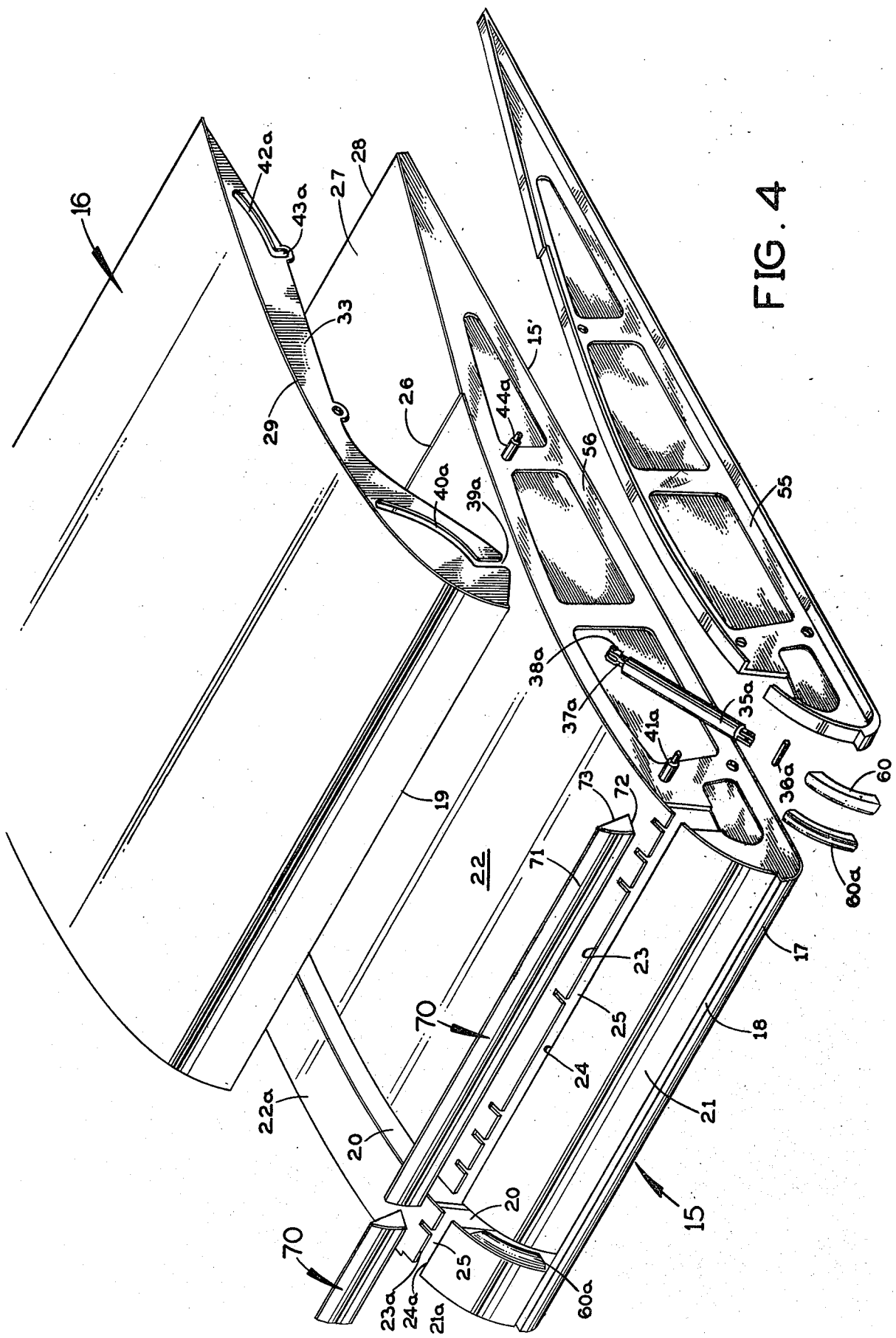

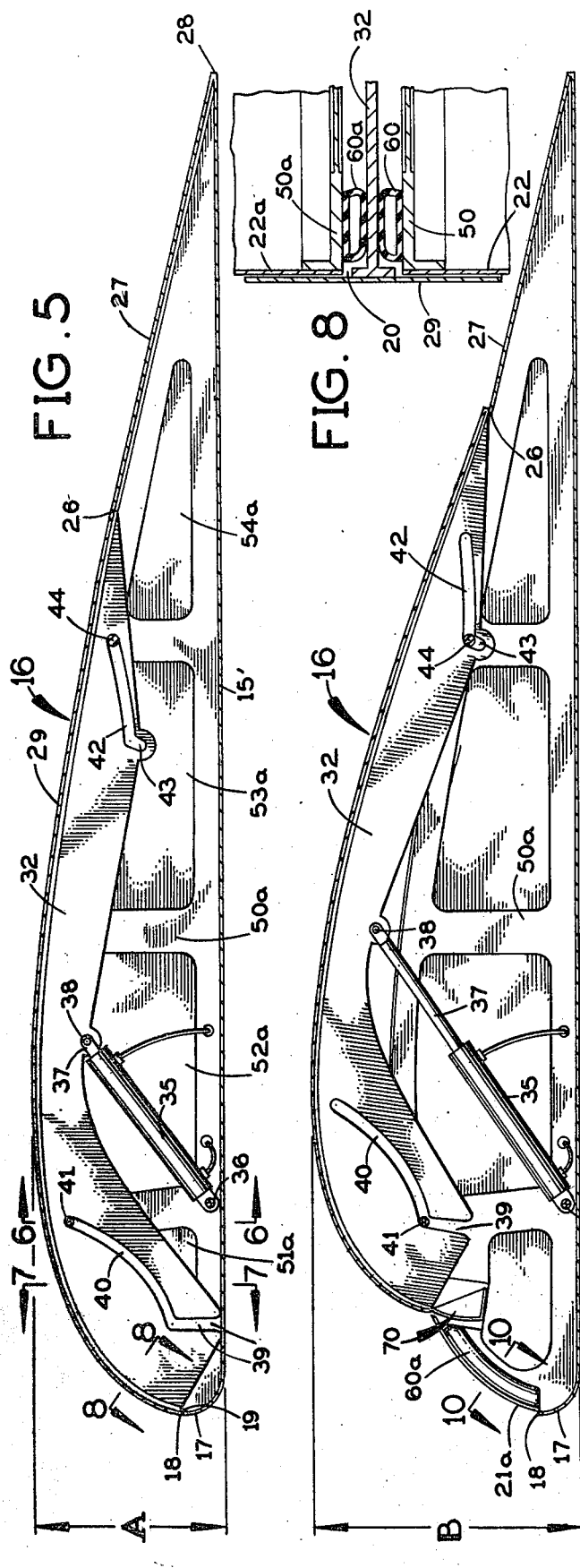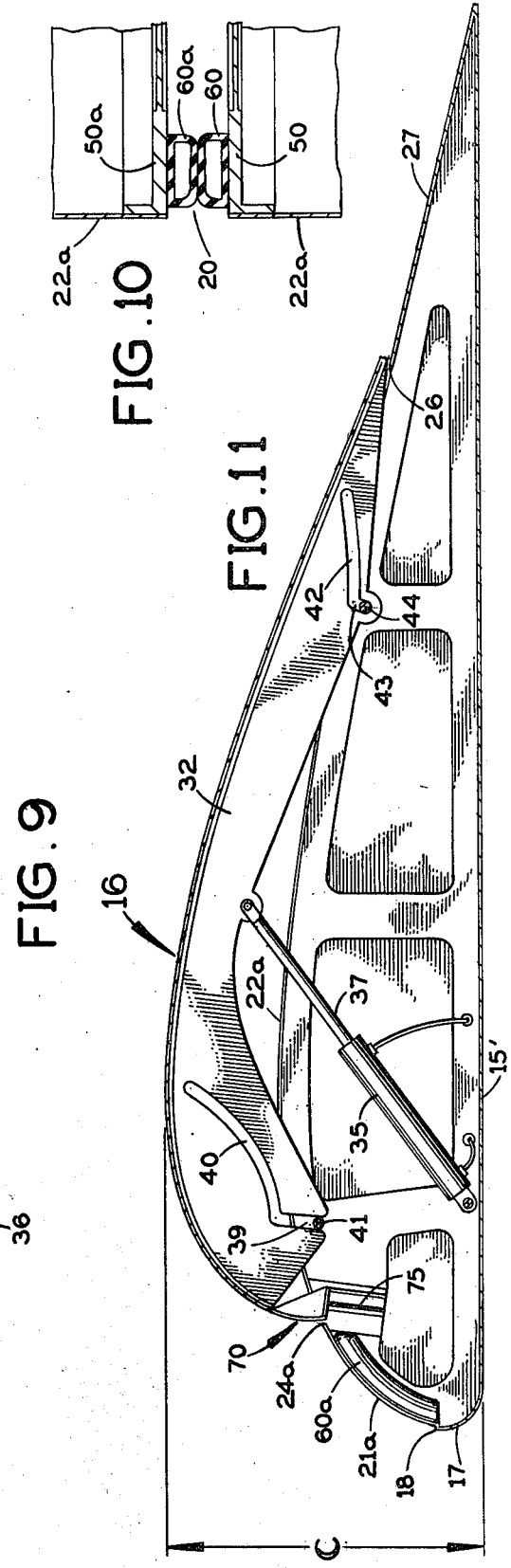

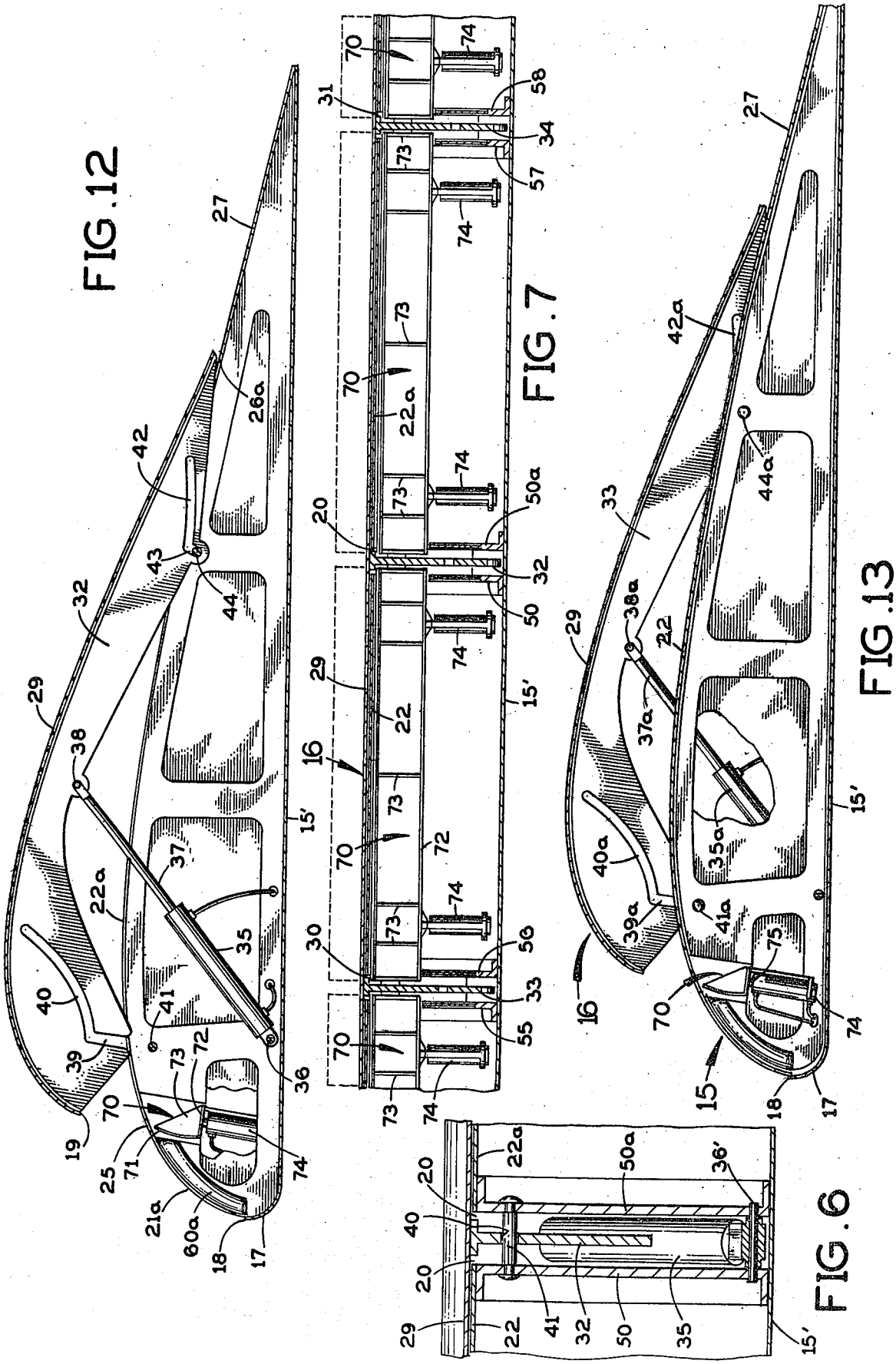

VARIABLE AIRFOIL ASSEMBLY

CROSS REFERENCE TO RELATED APPLICATION

This application is a continuation-in-part of my co-pending U.S. patent application Ser. No. 06/136,682, filed Apr. 2, 1980 now abandoned.

SUMMARY OF THE INVENTION

This invention relates to a variable airfoil assembly, such as an airplane wing, whose cross-sectional shape in the direction of its movement through the air may be selectively changed to alter its aerodynamic properties.

My U.S. Pat. No. 4,182,503 discloses a variable airfoil assembly having a fixed airfoil member with a top recess of substantial depth in which an adjustable airfoil member is pivotally adjustable between a lowered position, in which its top surface merges smoothly with the top surfaces of the fixed airfoil member in front of and behind the recess, and various raised positions projecting up beyond the top of the fixed airfoil member to increase the camber of the wing.

The now-preferred embodiment of the present invention comprises a hollow, fixed airfoil member with a shallow recess on the top in which an adjustable airfoil member may be seated snugly for low lift, low drag performance. This recess extends between a narrow upwardly-facing shoulder on its leading end and a narrow, forwardly-facing shoulder toward its back edge. The adjustable airfoil member has a curved sheet metal plate which fits between these shoulders and presents a convex top surface which blends smoothly with the adjacent surfaces on the fixed airfoil member in front and behind when the adjustable airfoil member is lowered. Longitudinal reinforcing ribs on the bottom of the adjustable airfoil member extend down into corresponding gaps in the top of the fixed airfoil member. Cylinder-and-piston units in the fixed airfoil member are coupled to these ribs for raising and lowering the adjustable airfoil member. Seals at these gaps in the nose prevent the entry of air there in all positions of the adjustable airfoil member. At the rear of its nose the fixed airfoil member has a transverse gap where filler pieces are located for adjustment up into engagement with the front edge of the adjustable airfoil member when the latter is partly raised or down away from engagement with that edge to admit air under the adjustable airfoil member when it is raised higher for braking purposes. Internal longitudinal partitions divide the interior of the fixed airfoil member into compartments into which little or no air enters, even in the braking position of the adjustable airfoil member.

A principal object of this invention is to provide a novel and improved variable airfoil assembly.

Another object of this invention is to provide such an assembly having a fixed airfoil member with a shallow recess in the top and an adjustable airfoil member with a sheet metal body which is adapted to seat snugly in that recess when the adjustable airfoil member is lowered.

Further objects and advantages of this invention will appear from the following detailed description and appended claims, reference being had to the accompanying drawings forming a part of this specification wherein like reference characters designate corresponding parts in the several views.

DESCRIPTION OF THE DRAWINGS

FIG. 4 is a partial exploded perspective view showing different component parts of the variable airfoil assembly;

FIG. 5 is a longitudinal vertical section taken along the line 5—5 in FIG. 1;

FIG. 6 is a fragmentary vertical cross-section taken along the line 6—6 in FIG. 5 and showing one of the cylinder-and-piston units for raising and lowering the adjustable airfoil member;

FIG. 7 is a partial vertical cross-section taken along the line 7—7 in FIG. 5 and showing cylinder-and-piston units for raising and lowering adjustable filler panels at a transverse gap in the fixed airfoil member behind its leading edge;

FIG. 8 is a fragmentary cross-section taken along the line 8—8 in FIG. 5;

FIG. 9 is a longitudinal vertical section taken along the line 9—9 in FIG. 2;

FIG. 10 is a fragmentary cross-section taken along the line 10—10 in FIG. 9;

FIG. 11 is a view similar to FIG. 9 but with the adjustable airfoil member raised farther;

FIG. 12 is a longitudinal vertical section taken along the line 12—12 in FIG. 3; and FIG. 13 is a longitudinal vertical section taken along the line 13—13 in FIG. 3.

DETAILED DESCRIPTION

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Figure 1:
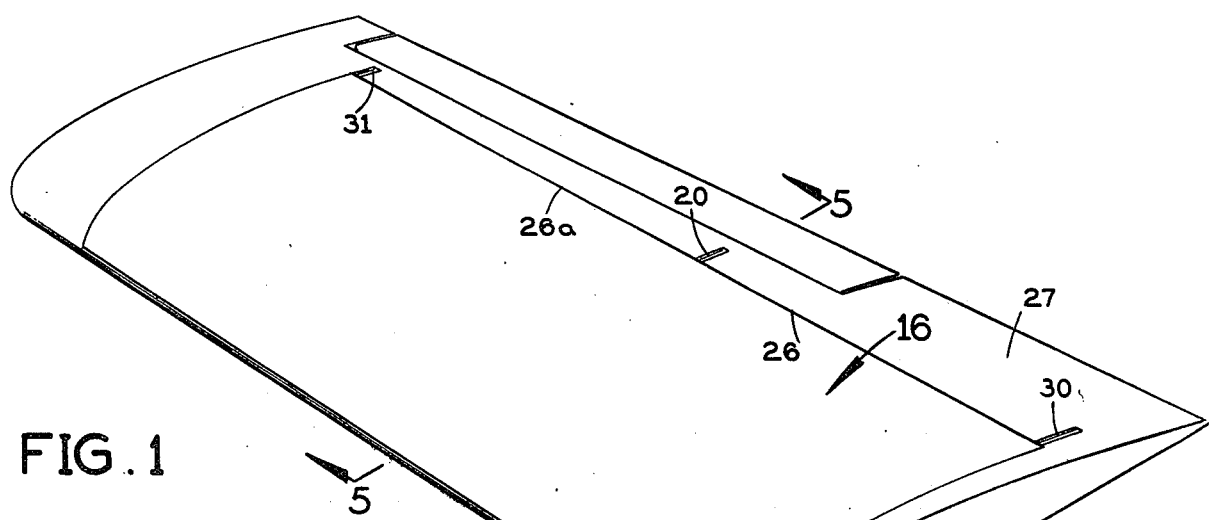
FIG. 1 is a front perspective view of the present variable airfoil assembly with the adjustable airfoil member fully retracted.
Figure 2:
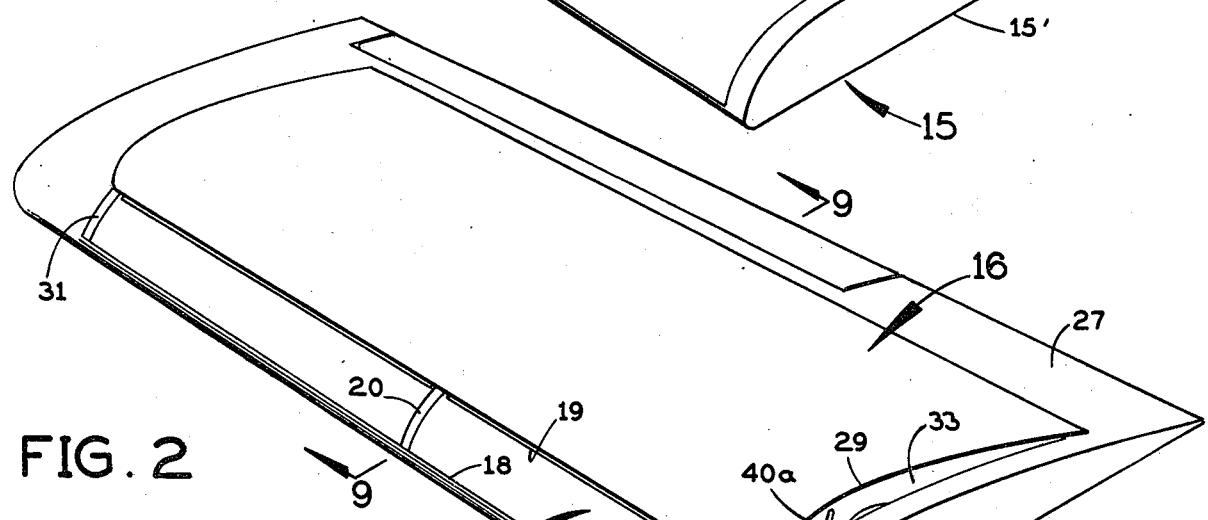
FIG. 2 is a similar view showing the adjustable airfoil member partly raised.

Referring first to FIG. 2, the present variable airfoil assembly has a fixed airfoil member 15 and an adjustable airfoil member 16 which can be raised and lowered with respect to the fixed airfoil member. In its lowered, fully retracted position (FIG. 1) the adjustable airfoil member 16 fits snugly in a vertically shallow recess formed in the top of the fixed airfoil member 15. In this position, the top surface of the adjustable airfoil member 16 merges smoothly with the top surfaces of the fixed airfoil member 15 immediately in front of and behind the adjustable airfoil member.

As shown in FIG. 4, the fixed airfoil member presents a sheet metal, flat, bottom wall 15' and an upwardly curved, convex, front lip 17 at its leading edge which terminates in an upwardly-facing, narrow, horizontal shoulder 18 against which the front edge 19 of the adjustable airfoil member 16 abuts when the adjustable airfoil member is in its lowered, fully retracted position (FIG. 5). The curved front lip 17 is continuous across the full width of the fixed airfoil member 15. The shoulder 18 on the fixed airfoil member is continuous across the full width of the adjustable airfoil member 16.

Midway along its length the fixed airfoil member 15 is formed with a longitudinal gap 20. To the right of this gap in FIG. 4, immediately above and behind the shoulder 18 the fixed airfoil member presents a rearwardly and upwardly curving front plate segment 21 with a convex top face. On the opposite side of gap 20 the fixed airfoil member presents a similarly curved front plate segment 21a extending up behind shoulder 18.

Along the top on one side of the longitudinal gap 20, the fixed airfoil member 15 presents a curved top plate segment 22 with a convex top face whose front edge 23 is separated from the top rear edge 24 of plate 21 by a transverse gap 25, which is relatively narrow in the front-to-back direction along the airfoil, i.e., longitudinally of the air flow across the airfoil. The curved top plate segment 22 extends rearward from this transverse gap 25 to an upwardly extending, forwardly-facing, transverse, rear shoulder 26, which is short vertically. Behind this shoulder the fixed airfoil member presents a rearwardly extending, downwardly-curving, rear top plate 27, which extends back to the rear edge 28 of the airfoil assembly. The longitudinal gap 20 extends into the rear top plate 27 a short distance behind shoulder 26, as shown in FIG. 1.

On the opposite side of the longitudinal gap 20 the fixed airfoil member presents a top plate segment 22a of the same curvature as plate 22 and extending back to a shoulder 26a identical to shoulder 26 and at the same location rearwardly along the fixed airfoil member.

Figure 3:
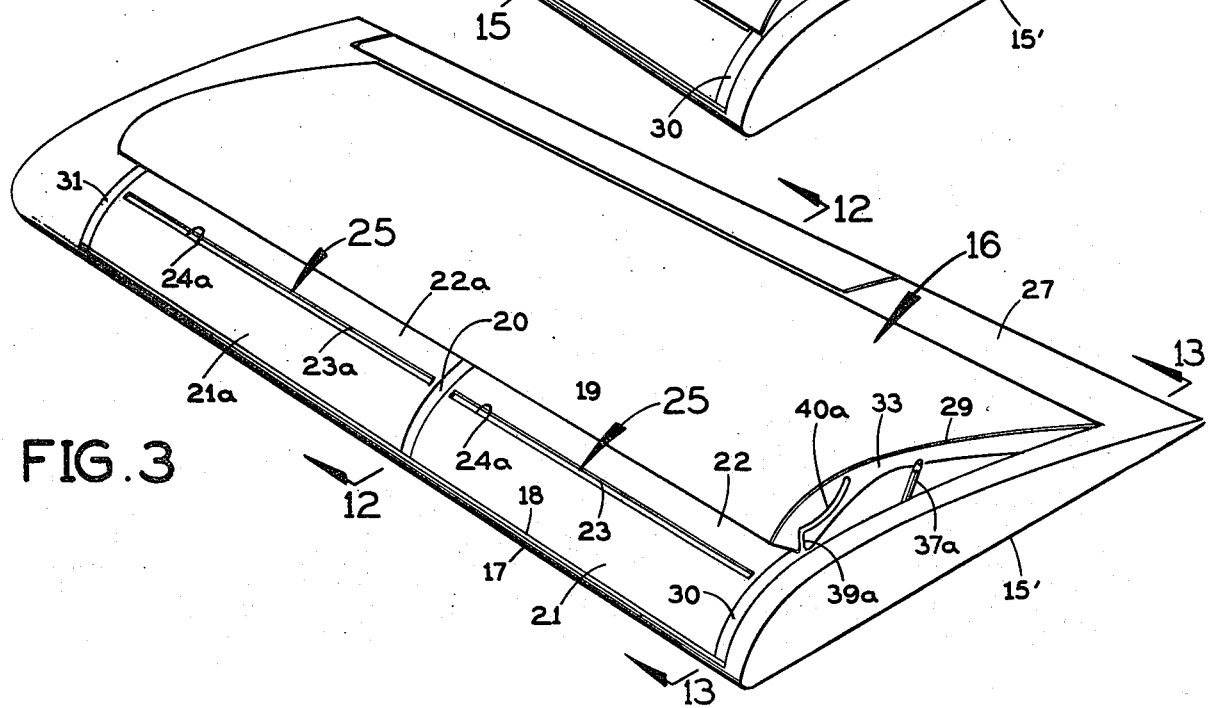
FIG. 3 is a similar view showing the adjustable airfoil member raised even more and with certain parts omitted for clarity.

As shown in FIG. 3, the transverse gap 25 separates the front edge 23a of top plate segment 22a from the top rear edge 24a of front plate segment 21a on this side of the longitudinal gap 20 in the fixed airfoil member.

The transverse front shoulder 18, the transverse rear shoulders 26 and 26a, and the curved plate segments 21, 22, 21a and 22a define a shallow recess in the top of the fixed airfoil member. The depth of this recess is equal to the width of the front shoulder 18 in a front-to-back direction along the airfoil and the height of the rear shoulders 26 and 26a.

The adjustable airfoil member 16 presents a curved sheet metal top plate 29 which fits snugly in this recess in the top of the fixed airfoil member 15 when the adjustable airfoil member is in its fully retracted, lowered position, as shown in FIGS. 1 and 5. In this position the front of the top face of plate 29 in the adjustable airfoil member 16 merges smoothly with the curved leading edge surface 17 at the front of the fixed airfoil member 15 and the rear of the top face of plate 29 in the adjustable airfoil member 16 merges smoothly with the top face of the rear top plate 27 on the fixed airfoil member 15 behind the rear shoulders 26 and 26a. Consequently, in this position the fixed and adjustable airfoil member 15 and 16 present a smooth, virtually continuous, convex, top surface across which air can flow without turbulence.

When the adjustable airfoil member 16 is raised, the top of the fixed airfoil member 15 presents an almost continuous smooth, convex top face whose continuity is broken only by the front shoulder 18 which are narrow in the direction of the air flow across the top of the fixed airfoil member and therefore do not introduce excessive turbulence when exposed to the air flow (i.e., when the adjustable airfoil member 16 is raised).

Referring to FIG. 3, at the top the fixed airfoil member presents a second longitudinal gap or slot 30 near the right end and a similar gap or slot 31 near its left end. The adjustable airfoil member 16 extends laterally between these end slots 30 and 31 and completely covers them when retracted (FIG. 1), except at their rear ends. As shown in FIG. 7, the adjustable airfoil member 16 has three longitudinal reinforcing ribs 32, 33 and 34 which extend down from its curved top plate 29 and are received respectively in the longitudinal gaps or slots 20, 30 and 31 in the top of the fixed airfoil member 15. Rib 33 is shown in detail in FIGS. 4 and 13 and rib 32 is shown in detail in FIGS. 5, 9, 11 and 12. All three reinforcing ribs are substantially identical. At each of these ribs a fluid-operated cylinder-and-piston unit, preferably hydraulic, acts between the adjustable airfoil member 16 and the bottom 15' of the fixed airfoil member 15 to raise and lower the adjustable airfoil member.

Referring to FIG. 5, at the central rib 32 midway across the adjustable airfoil member 16 a cylinder 35 is pivotally mounted at 36 directly above the bottom wall 15' of the fixed airfoil member 15. A fluid-operated piston is slidably mounted in this cylinder and is attached to a piston rod 37 whose upper end is pivotally connected at 38 to the rib 32 on the adjustable airfoil member 16. When pressurized fluid is introduced into the upper end of cylinder 35 the piston rod 37 is retracted, pulling the adjustable airfoil member 16 down to the lowered position shown in FIG. 5. The piston rod 37 may be extended partly or fully to raise the adjustable airfoil member 16 a corresponding amount by introducing pressurized fluid into the lower end of cylinder 35.

The depending rib 32 on the adjustable airfoil member 16 is formed with a slot which extends vertically up from the bottom edge of the web, as shown at 39 in FIG. 5, and then curves rearward and upward at 40 with a curvature which runs opposite to the curvature of the leading edge of the airfoil assembly. The fixed airfoil member 15 carries a fixed, transverse, horizontal pin 41 which extends snugly but slidably across the slot 40, 39 in the adjustable airfoil member 16 so as to guide the front end of the adjustable airfoil member 16 when the cylinder-and-piston unit raises or lowers it. As shown in FIG. 5, when the adjustable airfoil member 16 is fully lowered, the upper end of the curved portion 40 of its slot engages the pin 41. FIG. 9 shows the adjustable airfoil member 16 partly raised to a position where the corner intersection of the curved slot portion 40 and the straight slot portion 39 is at the pin 41. FIG. 11 shows the adjustable airfoil member 16 raised still farther to a position in which the lower end of the straight slot portion 39 in the adjustable airfoil member 16 is at the pin 41. FIG. 12 shows the adjustable airfoil member 16 raised to an even higher position in which the straight slot portion 39 is completely spaced above the pin 41 on the fixed airfoil member 15.

Toward its back end (to the right in FIG. 5) the depending rib 32 on the adjustable airfoil member 16 is formed with a slot having a curved, generally horizontal portion 42 which extends generally from front to back along the airfoil assembly (i.e., from left to right in FIG. 5), and a much shorter, downwardly extending portion 43 at the front end of the curved portion 42. The fixed airfoil member 15 carries a fixed, horizontal cross pin 44 which is slidably engaged by the slot 42, 43. When the adjustable airfoil member 16 is down (FIG. 5), the rear end of its curved slot portion 42 engages cross pin 44. When the adjustable airfoil member 16 is in the partly raised position shown in FIG. 9, the intersection between its slot portions 42 and 43 is at the cross pin 44. When raised to the position shown in FIG. 11, the adjustable airfoil member 16 has the lower end of its short, depending slot segment 43 engaging the cross pin 44. This is also true if the adjustable airfoil member 16 is raised even farther, to the position shown in FIG. 12.

The end rib 33 on the adjustable airfoil member 16 is formed with similar slots, identified by the same reference numerals but with an "a" suffix added in FIGS. 4 and 13. At this rib a similar cylinder-and-piston unit 35a, 37a acts between the bottom of the fixed airfoil member 15 and the adjustable airfoil member 16 for raising and lowering the latter.

The same arrangement (not shown in detail) is provided at the opposite end web 34 on the adjustable airfoil member 16.

It will be apparent that the ribs 32, 33 and 34 perform several functions. They reinforce the adjustable airfoil member 16 and enhance its rigidity. They couple the adjustable airfoil member to the cylinder-and-piston units which raise and lower it. They coact with the cross pins 41 and 44 on the fixed airfoil member to guide the adjustable airfoil member 16 when it is raised and lowered.

FIG. 6 shows how the cross pin 41 is mounted on the fixed airfoil member 15. A partition in the form of a rigid channel plate 50 extends vertically between the flat bottom plate 15' and the curved top plate 22 on one side of the longitudinal gap 20 in the fixed airfoil member 15. A similar channel plate 50a extends up from the bottom plate 15' to the curved top plate 22a on the fixed airfoil member 15 at the opposite side of its longitudinal gap 20. The two channel plates 50 and 50a are imperforate except where they receive cross pins. This is to prevent air turbulence inside the fixed airfoil member. The depending central web 32 on the adjustable airfoil member 16 extends down loosely between the channel plates 50 and 50a. The front cross pin 41 is mounted at each end in these channel plates and in the position shown in FIG. 6 it extends through the curved portion 40 of the slot in web 32 at the upper end of that slot.

The rear cross pin 44 is similarly supported by the channel plates 50 and 50a in the fixed airfoil member 15.

As shown in FIG. 6, the lower end of the cylinder 35 for raising and lowering the adjustable airfoil member 16 is pivotally mounted on a horizontal cross pin 36 extending between the two channel plates 50 and 50a and supported by both of them.

As shown in FIG. 5, the channel plate 50a is formed with reduced thickness segments 51a, 52a, 53a and 54a at intervals along its length from front-to-back along the airfoil. These segments of reduced wall thickness reduce the weight of the channel plate. Along the top and bottom and between the reduced segments 51a–54a, the channel plate is thicker to provide the necessary structural rigidity. The other channel plate 50 has the same construction as plate 50a.

At the longitudinal gap 30 in the fixed airfoil member 15 near one end, two similar channel plates 55 and 56 are located on opposite sides of the gap. These channel plates, which are shown in detail in FIG. 4, support the cross pins 41a and 44a and the pivot pin 36a for cylinder 35a. As shown in FIG. 7, the depending rib 33 on the adjustable airfoil member 16 extends down loosely between channel plates 55 and 56.

A similar pair of channel plates 57 and 58 are inside the fixed airfoil member 15 on opposite sides of the longitudinal gap 31 near its opposite end. FIG. 7 shows how the depending rib 34 on the adjustable airfoil member 16 extends down between channel plates 57 and 58.

Cross pins (not shown) extend horizontally between the channel plates 57 and 58 for reception in front and rear slots (not shown) in the rib 34 which are like the slots 39, 40 and 42, 43 in the middle web 32.

To seal the longitudinal gaps 20, 30 and 31 at the leading edge of the airfoil assembly, flexible, resilient, hollow, seal members of rubber-like material are provided. As shown in FIG. 10, at the gap 20 two such seal members 60 and 60a are adhesively attached to the neighboring or confronting faces of the channel plates 50 and 50a immediately behind the curved front plates 21 and 21a, respectively, on the fixed airfoil member 15. FIG. 9 shows that the seal member 60a is bent to a curvature like that of the curved front plate 21a. The other seal member 60 of this pair is similarly curved to match the curvature of the front plate 21 on the opposite side of gap 20.

When the adjustable airfoil member 16 is lowered to the fully retracted position shown in FIG. 5, the depending rib 32 will be between the seal members 60 and 60a and will flatten them, as shown in FIG. 8. When the adjustable airfoil member is raised as high as the FIG. 9 position or higher, it pulls the rib 32 out from between the seal members 60 and 60a and they spring back, due to their inherent resilient bias, into sealing engagement with each other, as shown in FIG. 10. In either case, the longitudinal gap 20 is sealed at the leading edge of the fixed airfoil member 15.

Similar paired sealed members (not shown) are provided at the longitudinal gaps 30 and 31 to seal these gaps at the leading edge of the fixed airfoil member 15 in every position of the adjustment airfoil member 16.

When the adjustable airfoil member 16 is partly raised, the space between its front edge 19 and the top edges 24 and 24a on the nose of the fixed airfoil member 15 may be closed, when desired, by retractable filler pieces 70, as shown in FIG. 4. Four such filler pieces are provided, one to cover this space from the central longitudinal gap 20 to the longitudinal gap 30 near one end of the fixed airfoil member 15, a second to cover this space on the opposite side of end gap 30, a third to cover this space from the central longitudinal gap 20 to the longitudinal gap 31 near the opposite end of the fixed airfoil member 15, and a fourth to cover this space on the opposite side of end gap 31.

As shown in FIGS. 4 and 12, in cross section each filler piece 70 presents a curved front wall 71 which is convex, viewed from the front, a flat bottom wall 72 extending rearward from the front wall, and upstanding transverse walls 73 at each end and at intermediate points along the length of the filler piece to enhance its structural rigidity.

Each filler piece 70 is raised and lowered by one or more fluid-operated cylinder-and-piston units as shown in FIG. 13. The cylinder 74 is rigidly mounted inside the fixed airfoil member 15 near its front end. A reciprocable piston in the cylinder is attached to an upwardly extending piston rod 75 which supports the filler piece 70 from below.

As shown in FIG. 7, two such cylinder and piston units are coupled to each of the longer filler pieces 70 located on opposite sides of the central longitudinal gap 20 in the fixed airfoil member 15. A single cylinder-and-piston unit is coupled to each of the shorter filler pieces 70 extending laterally beyond the gaps 30 and 31, respectively.

The filler pieces 70 are in their fully retracted, lowered position when the adjustable airfoil member 16 is fully lowered, as shown in FIG. 5.

When the adjustable airfoil member 16 is raised to a position such as the one shown in FIG. 11, the filler members 70 may be raised up through the transverse gap 25, by actuating the cylinders 74, to substantially cover the space between the rear edge 24a of the nose on the fixed airfoil member 15 and the front edge 19 of the adjustable airfoil member 16.

For braking purposes, the adjustable airfoil member 16 may be raised to the position shown in FIG. 12 and the filler members 70 lowered to leave an opening under the front edge 19 of the adjustable airfoil member 16.

In the lowered position of the adjustable airfoil member 16 shown in FIGS. 1 and 5, the present variable airfoil assembly provides relatively low lift and low drag. The lift and drag are increased when the adjustable airfoil member is raised to the position shown in FIGS. 2 and 9 and even more when it is raised to the position shown in FIG. 11. For braking purposes the adjustable airfoil member can be raised to the position shown in FIGS. 12 and 13 and the filler pieces 70 lowered to enable air to flow under the adjustable airfoil member for maximum drag. Except during braking, when the adjustale airfoil member 16 is raised far enough to move its front edge 19 beyond the rear edge 24 of the nose on the fixed airfoil member 15, the filler pieces 70 will be raised to close the gap between these edges to minimize the flow of air beneath the adjustable airfoil member 16. The paired seal members 60 and 60a in the nose of the fixed airfoil member substantially prevent the entry of air into the longitudinal gaps 20, 30 and 31. The paired partitions 50 and 50a, 55 and 56 and 57 and 58 inside the hollow interior of the fixed airfoil member 15 substantially prevent air from flowing inside the fixed airfoil member except between the partitions of each pair.

I claim:

1. In a variable airfoil assembly having:
    a fixed airfoil member with a bottom wall, a convex nose extending upward and curving rearward from the front end of said bottom wall, and a rear top wall segment spaced behind said nose and inclined downward and rearward toward the rear end of said bottom wall;
    an adjustable airfoil member mounted for adjustment between a lowered position on top of said fixed airfoil member between said nose and said rear top wall segment and raised positions projecting up beyond the top of said fixed airfoil member;
    and means acting between said fixed and adjustable airfoil members for adjusting the position of said adjustable airfoil member on said fixed airfoil member;
    the improvement wherein:
    said fixed airfoil member presents a convex top plate extending behind the upper end of said nose and terminating at its rear end slightly below the front of said rear top wall segment;
    and said adjustable airfoil member comprises a curved sheet metal plate which closely overlies said nose and said top plate of the fixed airfoil member when the adjustable airfoil member is in said lowered position;
    said curved sheet metal plate presenting a convex top surface which in said lowered position of the adjustable airfoil member merges smoothly at its front end with the leading edge of said nose and merges smoothly at its rear end with said rear top wall segment of the fixed airfoil member;
    said fixed airfoil member being formed with narrow gaps in said top plate; and
    said adjustable airfoil member having narrow reinforcing ribs extending down from said curved sheet metal plate and received in said gaps in said lowered position of the adjustable airfoil member.

2. A variable airfoil assembly according to claim 1, wherein:
    said gaps extend longitudinally of said fixed airfoil member in front of said rear top wall segment of the fixed airfoil member and extend into said nose; and said reinforcing ribs extend longitudinally of said adjustable airfoil member.

3. A variable airfoil assembly according to claim 2, wherein:
    said means for adjusting said adjustable airfoil member comprises cylinder-and-piston units in said fixed airfoil member operatively coupled to said ribs to raise and lower the adjustable airfoil member.

4. A variable airfoil assembly according to claim 2, wherein:
    said ribs are formed with guide slots therein; and further comprising:
    cross pins on said fixed airfoil member slidably received in said slots to guide said adjustable airfoil member when it is raised and lowered.

5. A variable airfoil assembly according to claim 4, wherein:
    said means for adjusting said adjustable airfoil member comprises cylinder-and-piston units in said fixed airfoil member operatively coupled to said ribs to raise and lower the adjustable airfoil member.

6. A variable airfoil assembly according to claim 2, wherein said fixed airfoil member has a hollow interior and a plurality of pairs of rigid vertical partitions in its interior, with the partitions of each pair extending longitudinally of the fixed airfoil member and located respectively on opposite sides of said longitudinal gaps in the fixed airfoil member and dividing the interior of the fixed airfoil member into compartments.

7. A variable airfoil assembly according to claim 2, and further comprising:
    means for sealing said gaps in said nose of the fixed airfoil member when said adjustable airfoil member positions said ribs in said gaps in the nose and when said adjustable airfoil member positions said ribs out of said gaps in the nose.

8. A variable airfoil assembly according to claim 1, wherein:
    said fixed airfoil member presents a transverse gap at the top of its nose; and further comprising:
    filler means mounted in said fixed airfoil member for adjustment between a lowered position below said transverse gap and a raised position above said gap in which it substantially fills the space between the top of said nose and the front end of said adjustable airfoil member when the latter is raised.

9. In a variable airfoil assembly having:
    a fixed airfoil member with a bottom wall, a convex nose extending upward and curving rearward from the front end of said bottom wall, and a rear top wall segment spaced behind said nose and inclined downward and rearward toward the rear end of said bottom wall;

an adjustable airfoil member mounted for adjustment between a lowered position on top of said fixed airfoil member between said nose and said rear top wall segment and raised positions projected up beyond the top of said fixed airfoil member;

and means acting between said fixed and adjustable airfoil members for adjusting the position of said adjustable airfoil member on said fixed airfoil member;

the improvement wherein:

said nose on the fixed airfoil member presents a transverse, upwardly-facing, narrow, front shoulder at its leading edge and a rearwardly and upwardly curving front plate behind said shoulder;

said fixed airfoil member presents a convex top plate extending behind the upper end of said nose and terminating at its rear end slightly below the front of said rear top wall segment and presents a transverse, forwardly facing, narrow, rear shoulder at the juncture between said top plate and said rear top wall segment;

and said adjustable airfoil member comprises a curved sheet metal plate which fits between said front and rear shoulders on the fixed airfoil member and closely overlies said front plate and said top plate of the fixed airfoil member when the adjustable airfoil member is in said lowered position, said curved sheet metal plate presenting a convex top surface which in said lowered position of the adjustable airfoil member merges smoothly at its front end with the leadng edge of the fixed airfoil member below said front shoulder and merges smoothly at its rear end with said rear top wall segment of the fixed airfoil member behind said rear shoulder;

said adjustable airfoil member having laterally spaced, longitudinal ribs extending down from said curved sheet metal plate;

and said fixed airfoil member having laterally spaced, longitudinal gaps in said front plate of its nose and said convex top plate which receive said ribs on the adjustable airfoil member in said lowered position of the latter.

10. A variable airfoil assembly according to claim 9, wherein:

said means for adjusting the adjustable airfoil member comprises cylinder-and-piston units in said fixed airfoil member below said gaps operatively coupled to said ribs to raise and lower the adjustable airfoil member.

11. A variable airfoil assembly according to claim 10, wherein:

said ribs are formed with guide slots therein; and further comprising:

cross pins on said fixed airfoil member slidably received in said slots to guide said adjustable airfoil member when it is raised and lowered.

12. A variable airfoil assembly according to claim 11, and further comprising:

means for sealing said gaps in said nose of the fixed airfoil member when said adjustable airfoil member positions said ribs in said gaps in the nose and when said adjustable airfoil member positions said ribs out of said gaps in the nose.

13. A variable airfoil assembly according to claim 9, wherein:

said fixed airfoil member presents a transverse gap at the top between the upper end of said front plate of its nose and the front end of its convex top plate;

and further comprising:

filler means mounted on said fixed airfoil member for adjustment between a lowered position below said transverse gap in the fixed airfoil member and a raised position above said gap in which it substantially fills the space between the upper end of said front plate of said nose on the fixed airfoil member and the front end of said curved plate of the adjustable airfoil member when the latter is raised;

and means for moving said filler means between its lowered and raised positions.

14. A variable airfoil assembly according to claim 13, wherein:

said means for moving said filler means comprises fluid-operated cylinder-and-piston units spaced apart laterally across said fixed airfoil member.

15. A variable airfoil assembly according to claim 14, wherein:

said filler means comprises filler members respectively extending along said transverse gap between successive longitudinal gaps in the fixed airfoil member.

16. A variable airfoil assembly according to claim 15, and further comprising:

means for sealing said longitudinal gaps in said front plate of the nose on the fixed airfoil member when said adjustable airfoil member is lowered to position said ribs in said longitudinal gaps in the nose and when said adjustable airfoil member is raised to position said ribs out of said longitudinal gaps in the nose.

17. A variable airfoil assembly according to claim 16, wherein:

said means for adjusting the adjustable airfoil member comprises cylinder-and-piston units in said fixed airfoil member operatively coupled to said ribs to raise and lower the adjustable airfoil member;

and said ribs are formed with guide slots therein; and further comprising:

cross pins on said fixed airfoil member slidably received in said slots to guide said adjustable airfoil member when it is raised and lowered.

18. A variable airfoil assembly according to claim 17, and further comprising:

a plurality of pairs of longitudinal, laterally spaced, vertical rigid partitions inside said fixed airfoil member, with the partitions of each pair located respectively on opposite sides of said longitudinal gaps in the fixed airfoil member and supporting said cross pins.

19. A variable airfoil assembly according to claim 9, and further comprising:

a plurality of pairs of longitudinal, laterally spaced, vertical, rigid partitions inside said fixed airfoil member extending down from said convex top plate, with the partitions of each pair located respectively on opposite sides of said longitudinal gaps.

* * * * *